US006544495B1

(12) United States Patent
Elomari

(10) Patent No.: US 6,544,495 B1
(45) Date of Patent: *Apr. 8, 2003

(54) ZEOLITE SSZ-57 COMPOSITION OF MATTER AND SYNTHESIS THEREOF

(75) Inventor: Saleh Elomari, Fairfield, CA (US)

(73) Assignee: Chevron U.S.A. Inc., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/905,456

(22) Filed: Jul. 13, 2001

(51) Int. Cl.7 .............................................. C01B 39/48

(52) U.S. Cl. ...................... 423/706; 423/712; 423/713; 423/709; 423/718

(58) Field of Search ................................. 423/706, 713, 423/718, 709, 712

(56) References Cited

U.S. PATENT DOCUMENTS

| | | | | | |
|---|---|---|---|---|---|
| 4,269,813 | A | * | 5/1981 | Klotz | 423/277 |
| 4,623,526 | A | * | 11/1986 | Lam Shang Leen | 423/326 |
| 4,708,857 | A | * | 11/1987 | Leen et al. | 423/277 |
| 4,941,963 | A | * | 7/1990 | Valyocsik | 208/46 |
| 5,068,096 | A | * | 11/1991 | Valyocsik | 208/108 |
| 6,136,290 | A | * | 10/2000 | Benazzi et al. | 208/120.01 |

OTHER PUBLICATIONS

U.S. patent application Ser. No. 09/905,460, Elomari.

* cited by examiner

Primary Examiner—David Sample
(74) Attorney, Agent, or Firm—Richard J. Sheridan

(57) ABSTRACT

The present invention relates to a new crystalline zeolite SSZ-57. The present invention also relates to crystalline zeolites prepared by using N-butyl-N-cyclohexylpyrrolidinium cation, N-propyl-N-cycloheptylpyrrolidinium cation or N-butyl-N-cyclooctylpyrrolidinium cation as structure directing agents.

19 Claims, No Drawings

ZEOLITE SSZ-57 COMPOSITION OF MATTER AND SYNTHESIS THEREOF

BACKGROUND OF THE INVENTION

1. Field of the Invention

The present invention relates to new crystalline zeolite SSZ-57 and a method for preparing SSZ-57 using a N-butyl-N-cyclohexylpyrrolidinium cation, N-propyl-N-cycloheptylpyrrolidinium or N-butyl-N-cyclooctylpyrrolidinium cation as tempting agent.

2. State of the Art

Because of their unique sieving characteristics, as well as their catalytic properties, crystalline molecular sieves and zeolites are especially useful in applications such as hydrocarbon conversion, gas drying and separation. Although many different crystalline molecular sieves have been disclosed, there is a continuing need for new zeolites with desirable properties for gas separation and drying, hydrocarbon and chemical conversions, and other applications. New zeolites may contain novel internal pore architectures, providing enhanced selectivities in these processes.

Crystalline aluminosilicates are usually prepared from aqueous reaction mixtures containing alkali or alkaline earth metal oxides, silica, and alumina. Crystalline borosilicates are usually prepared under similar reaction conditions except that boron is used in place of aluminum. By varying the synthesis conditions and the composition of the reaction mixture, different zeolites can often be formed.

SUMMARY OF THE INVENTION

The present invention is directed to a family of crystalline molecular sieves with unique properties, referred to herein as "zeolite SSZ-57" or simply "SSZ-57". Preferably, SSZ-57 is obtained in its borosilicate form, but the present novel zeolite can be synthesized in both the borosilicate or aluminosilicate phase. The term "borosilicate" refers to a zeolite containing oxides of both boron and silicon. The term "aluminosilicate refers to a zeolite containing oxides of both aluminum and silicon.

In accordance with this invention, there is provided a zeolite having a mole ratio greater than about 20 of an oxide selected from silicon oxide, germanium oxide and mixtures thereof to boron oxide or a combination of boron oxide and aluminum oxide, gallium oxide, indium oxide, titanium oxide or a mixture thereof and having, after calcination, the X-ray diffraction lines of Table 3 below.

The present invention further provides such a zeolite having a composition, as synthesized and in the anhydrous state, in terms of mole ratios as follows:

| | |
|---|---|
| $YO_2/WcOd$ | $20–\infty$ |
| $M_{2/n}YO_2$ | 0.01–0.03 |
| $Q/YO_2$ | 0.02–0.05 | wherein Y is silicon, germanium or a mixture thereof; W is boron or a combination of boron and aluminum, gallium, indium, titanium or a mixture thereof; M is an alkali metal cation, alkaline earth metal cation or mixtures thereof; n is the valence of M (i.e., 1 or 2); c is 1 or 2; d is 2 when c is 1 (i.e., W is tetravalent) or d is 3 or 5 when c is 2 (i.e., d is 3 when W is trivalent or 5 when W is pentavalent); and Q comprises a N-butyl-N-cyclohexylpyrrolidinium cation, N-propyl-N-cycloheptylpyrrolidinium cation or N-butyl-N-cyclooctylpyrrolidinium.

In accordance with this invention, there is also provided a zeolite prepared by thermally treating a zeolite having a mole ratio of an oxide selected from silicon oxide, germanium oxide and mixtures thereof to boron oxide or a combination of boron oxide and aluminum oxide, gallium oxide, indium oxide, titanium oxide or a mixture thereof greater than about 20 at a temperature of from about 200° C. to about 1100° C., the thus-prepared zeolite having the X-ray diffraction lines of Table 3 below. The present invention also includes this thus-prepared zeolite which is predominantly in the hydrogen form, which is prepared by ion exchanging with an acid or with a solution of an ammonium salt followed by a second calcination.

Also provided in accordance with the present invention is a method of preparing a crystalline material comprising an oxide selected from silicon oxide, germanium oxide and mixtures thereof and boron oxide or a combination of boron oxide and aluminum oxide, gallium oxide, indium oxide, titanium oxide or a mixture thereof, said method comprising contacting under crystallization conditions sources of said oxides and a tempting agent comprising a N-butyl-N-cyclohexylpyrrolidinium cation, N-propyl-N-cycloheptylpyrrolidinium cation or N-butyl-N-cyclooctylpyrrolidinium.

DETAILED DESCRIPTION OF THE INVENTION

The present invention comprises a family of crystalline zeolites designated herein "zeolite SSZ-57" or simply "SSZ-57".

In preparing SSZ-57 zeolites, a N-cyclohexyl-N-butylpyrrolidinium ammonium cation, N-propyl-N-cycloheptylpyrrolidinium cation or N-butyl-N-cyclooctylpyrrolidinium is used as a crystallization template. In general, SSZ-57 is prepared by contacting an active source of an oxide selected from silicon oxide, germanium oxide and mixtures thereof and boron oxide or a combination of boron oxide and aluminum oxide, gallium oxide, indium oxide, titanium oxide or a mixture thereof with the tempting agent.

SSZ-57 is prepared from a reaction mixture having the composition shown in Table A below.

TABLE A

| | Reaction Mixture | |
|---|---|---|
| | Typical | Preferred |
| $YO_2/WaO_b$ | $20–\infty$ | 35–90 |
| $OH^-/YO_2$ | 0.1–0.50 | 0.2–0.3 |
| $Q/YO_2$ | 0.05–0.5 | 0.1–0.2 |
| $M_{2/n}/YO_2$ | 0.02–0.4 | 0.1–0.25 |
| $H_2O/YO_2$ | 25–80 | 30–50 | where Y, W, Q, M and n are as defined above, and a is 1 or 2 and b is 2 when a is 1 (i.e., W is tetravalent) or b is 3 when a is 2 (i.e., W is trivalent).

In practice, SSZ-57 is prepared by a process comprising:

(a) preparing an aqueous solution containing sources of at least one oxide capable of forming a crystalline molecular sieve and the N-butyl-N-cyclohexylpyrrolidinium cation, N-propyl-N-cycloheptylpyrrolidinium cation or N-butyl-N-cyclooctylpyrrolidinium in the presence of an anionic counterion which is not detrimental to the formation of SSZ-57;

(b) maintaining the aqueous solution under conditions sufficient to form crystals of SSZ-57; and (c) recovering the crystals of SSZ-57.

Accordingly, SSZ-57 may comprise the crystalline material and the tempting agent in combination with metallic and non-metallic oxides bonded in tetrahedral coordination through shared oxygen atoms to form a cross-linked three dimensional crystal structure. The metallic and non-metallic oxides comprise an oxide selected from silicon oxide, germanium oxide and mixtures thereof and boron oxide or a combination of boron oxide and aluminum oxide, gallium oxide, indium oxide, titanium oxide or a mixture thereof.

Typical sources of silicon oxide include silicates, silica hydrogel, silicic acid, fumed silica, colloidal silica, tetra-alkyl orthosilicates, and silica hydroxides. Boron, as well as aluminum, gallium, germanium, titanium, and indium can be added in forms corresponding to their silicon counterparts.

A source zeolite reagent may provide a source of boron. In most cases, the source zeolite also provides a source of silica. The source zeolite in its dealuminated or deboronated form may also be used as a source of silica, with additional silicon added using, for example, the conventional sources listed above. Use of a source zeolite reagent as a source of alumina for the present process is more completely described in U.S. Pat. No. 5,225,179, issued Jul. 6, 1993 to Nakagawa entitled "Method of Making Molecular Sieves", the disclosure of which is incorporated herein by reference.

Typically, an alkali metal hydroxide and/or an alkaline earth metal hydroxide, such as the hydroxide of sodium, potassium, lithium, cesium, rubidium, calcium, and magnesium, is used in the reaction mixture; however, this component can be omitted so long as the equivalent basicity is maintained. The tempting agent may be used to provide hydroxide ion. Thus, it may be beneficial to ion exchange, for example, the halide for hydroxide ion, thereby reducing or eliminating the alkali metal hydroxide quantity required. The alkali metal cation or alkaline earth cation may be part of the as-synthesized crystalline oxide material, in order to balance valence electron charges therein.

The reaction mixture is maintained at an elevated temperature until the crystals of the SSZ-57 zeolite are formed. The hydrothermal crystallization is usually conducted under autogenous pressure, at a temperature between 100° C. and 200° C., preferably between 135° C. and 160° C. The crystallization period is typically greater than 1 day and preferably from about 3 days to about 20 days.

Preferably, the zeolite is prepared using mild stirring or agitation.

During the hydrothermal crystallization step, the SSZ-57 crystals can be allowed to nucleate spontaneously from the reaction mixture. The use of SSZ-57 crystals as seed material can be advantageous in decreasing the time necessary for complete crystallization to occur. In addition, seeding can lead to an increased purity of the product obtained by promoting the nucleation and/or formation of SSZ-57 over any undesired phases. When used as seeds, SSZ-57 crystals are added in an amount between 0.1 and 10% of the weight of silica used in the reaction mixture.

Once the zeolite crystals have formed, the solid product is separated from the reaction mixture by standard mechanical separation techniques such as filtration. The crystals are water-washed and then dried, e.g., at 90° C. to 150° C. for from 8 to 24 hours, to obtain the as-synthesized SSZ-57 zeolite crystals. The drying step can be performed at atmospheric pressure or under vacuum.

SSZ-57, as prepared, has a mole ratio of an oxide selected from silicon oxide, germanium oxide and mixtures thereof to boron oxide or a combination of boron oxide and aluminum oxide, gallium oxide, indium oxide, titanium oxide or a mixture thereof greater than about 20; and has the X-ray diffraction lines of Table I below. SSZ-57 further has a composition, as-synthesized and in the anhydrous state, in terms of mole ratios, shown in Table B below.

TABLE B

As-Synthesized SSZ-57

| | |
|---|---|
| $YO_2/W_cO_d$ | 20–∞ |
| $M_{2/n}YO_2$ | 0.01–0.03 |
| $Q/YO_2$ | 0.02–0.05 | where Y, W, c, d, M, n and Q are as defined above.

SSZ-57 can be made essentially aluminum free, i.e., having a silica to alumina mole ratio approaching ∞. A method of increasing the mole ratio of silica to alumina is by using standard acid leaching or chelating treatments. However, essentially aluminum-free SSZ-57 can be synthesized directly using essentially aluminum-free silicon and boron sources. SSZ-57 is generally prepared directly as a borosilicate.

Lower silica to alumina ratios may also be obtained by using methods which insert aluminum into the crystalline framework. For example, aluminum insertion may occur by thermal treatment of the zeolite in combination with an alumina binder or dissolved source of alumina. Such procedures are described in U.S. Pat. No. 4,559,315, issued on Dec. 17, 1985 to Chang et al.

It is believed that SSZ-57 is comprised of a new framework structure or topology which is characterized by its X-ray diffraction pattern. SSZ-57 zeolites, as-synthesized, have a crystalline structure whose X-ray powder diffraction pattern exhibit the characteristic lines shown in Table 1 and is thereby distinguished from other zeolites.

TABLE 1

As-Synthesized SSZ-57

| Two Theta (deg.)[a] | d-spacing | Intensity $I/I_o$[b] |
|---|---|---|
| 7.7 +/- 0.15 | 11.5 | S |
| 8.8 | 10.0 | M |
| 14.65 | 6.04 | W |
| 15.55 | 5.69 | W |
| 17.65 | 5.02 | W |
| 20.85 | 4.26 | W |
| 23.05 | 3.86 | VS |
| 24.35 | 3.65 | M |
| 26.6 | 3.35 | W |
| 30.2 | 2.96 | W |
| 45.1 | 2.10 | W |

[a] ± 0.15
[b] The X-ray patterns provided are based on a relative intensity scale in which the strongest line in the X-ray pattern is assigned a value of 100: W(weak) is less than 20; M(medium) is between 20 and 40; S(strong) is between 40 and 60; VS(very strong) is greater than 60.

The complete X-ray diffraction pattern of a boron SSZ-57 zeolite is shown in Table 2 below:

TABLE 2

Data for the As-Synthesized SSZ-57

| 2 Theta (deg.)[a] | d-spacing (Å) | Intensity $I/Io$ × 100 |
|---|---|---|
| 7.74 | 11.413 | 32 |
| 8.78 | 10.063 | 22 |

TABLE 2-continued

Data for the As-Synthesized SSZ-57

| 2 Theta (deg.)[a] | d-spacing (Å) | Intensity I/Io × 100 |
|---|---|---|
| 11.72 | 7.545 | 7 |
| 12.42 | 7.121 | 5 |
| 13.86 | 6.384 | 2 |
| 14.26 | 6.206 | 3 |
| 14.66 | 6.038 | 4 |
| 15.56 | 5.690 | 4 |
| 17.14 | 5.169 | 3 |
| 17.64 | 5.024 | 3 |
| 18.96 | 4.677 | 3 |
| 19.28 | 4.600 | 1 |
| 19.76 | 4.489 | 2 |
| 20.86 | 4.255 | 4 |
| 21.82 | 4.070 | 1 |
| 23.04 | 3.857 | 100 |
| 23.44 | SH3.792 | 5 |
| 24.32 | 3.657 | 12 |
| 25.98 | 3.427 | 3 |
| 26.62 | 3.346 | 5 |
| 27.75 | 3.212 | 1 |
| 28.96 | 3.081 | 3 |
| 29.46 | 3.030 | 2 |
| 30.22 | 2.955 | 6 |
| 31.54 | 2.834 | 1 |
| 32.36 | 2.764 | 1 |
| 34.10 | 2.627 | 2 |
| 35.40 | 2.534 | 2 |
| 35.76 | 2.509 | 2 |
| 36.18 | 2.481 | 2 |
| 36.90 | 2.434 | 1 |
| 37.64 | 2.388 | 1 |
| 43.24 | 2.091 | 1 |
| 45.12 | 2.008 | 7 |
| 45.30 | SH2.000 | 4 |
| 47.52 | 1.912 | 1 |
| 48.52 | 1.875 | 2 |

SH = Shoulder
[a]± 0.15

After calcination, the SSZ-57 zeolites have a crystalline structure whose X-ray powder diffraction pattern include the characteristic lines shown in Table 3:

TABLE 3

Calcined SSZ-57

| Two Theta (deg.)[a] | d-spacing (Å) | Intensity I/Io |
|---|---|---|
| 7.7 | 11.5 | VS |
| 8.8 | 10.0 | VS |
| 14.7 | 6.02 | M |
| 15.55 | 5.69 | W |
| 17.65 | 5.02 | W |
| 20.8 | 4.27 | W |
| 23.10 | 3.85 | VS |
| 24.4 | 3.65 | M |
| 26.65 | 3.34 | W |
| 30.25 | 2.95 | W |
| 45.25 | 2.00 | W |

[a]± 0.15

The complete X-ray diffraction pattern for an SSZ-57 calcined zeolite is shown in Table 4:

TABLE 4

Calcined SSZ-57

| 2 Theta (deg.)[a] | d-spacing (Å) | Intensity I/Io × 100 |
|---|---|---|
| 7.72 | 11.443 | 100 |
| 8.78 | 10.063 | 74 |

TABLE 4-continued

Calcined SSZ-57

| 2 Theta (deg.)[a] | d-spacing (Å) | Intensity I/Io × 100 |
|---|---|---|
| 11.74 | 7.532 | 2 |
| 12.43 | 7.115 | 2 |
| 13.84 | 6.393 | 3 |
| 14.24 | 6.215 | 1 |
| 14.70 | 6.021 | 17 |
| 15.56 | 5.690 | 8 |
| 17.16 | 5.163 | 1 |
| 17.66 | 5.018 | 11 |
| 19.00 | 4.667 | 2 |
| 19.32 | 4.591 | 1 |
| 19.74 | 4.494 | 2 |
| 20.82 | 4.263 | 3 |
| 23.08 | 3.850 | 91 |
| 23.48 | SH3.786 | 5 |
| 24.36 | 3.651 | 11 |
| 25.05 | 3.552 | 1 |
| 26.04 | 3.419 | 4 |
| 26.66 | 3.341 | 6 |
| 29.00 | 3.076 | 3 |
| 29.52 | 3.023 | 2 |
| 30.26 | 2.951 | 7 |
| 31.56 | 2.833 | 1 |
| 31.90 | 2.803 | 1 |
| 34.20 | 2.620 | 2 |
| 35.46 | 2.529 | 1 |
| 35.84 | 2.503 | 2 |
| 36.28 | 2.474 | 1 |
| 36.96 | 2.430 | 1 |
| 37.76 | 2.380 | 1 |
| 43.97 | 2.058 | 1 |
| 45.26 | 2.002 | 16 |
| 46.22 | 1.962 | 1 |
| 47.58 | 1.910 | 1 |
| 48.60 | 1.872 | 1 |

SH = Shoulder
[a]± 0.15

The X-ray powder diffraction patterns were determined by standard techniques. The radiation was the K-alpha/doublet of copper. The peak heights and the positions, as a function of 2 Theta where Theta is the Bragg angle, were read from the relative intensities of the peaks, and d, the interplanar spacing in Angstroms corresponding to the recorded lines, can be calculated.

The variation in the scattering angle (two theta) measurements, due to instrument error and to differences between individual samples, is estimated at ±0.15 degrees.

The X-ray diffraction pattern of Table 1 is representative of "as-synthesized" or "as-made" SSZ-57 zeolites. Minor variations in the diffraction pattern can result from variations in the silica-to-boron or silica-to-alumina mole ratio of the particular sample due to changes in lattice constants. In addition, sufficiently small crystals will affect the shape and intensity of peaks, leading to significant peak broadening.

Representative peaks from the X-ray diffraction pattern of calcined SSZ-57 are shown in Table 3. Calcination can also result in changes in the intensities of the peaks as compared to patterns of the "as-made" material, as well as minor shifts in the diffraction pattern. The zeolite produced by exchanging the metal or other cations present in the zeolite with various other cations (such as H+ or NH4+) yields essentially the same diffraction pattern, although again, there may be minor shifts in the interplanar spacing and variations in the relative intensities of the peaks. Notwithstanding these minor perturbations, the basic crystal lattice remains unchanged by these treatments.

Crystalline SSZ-57 can be used as-synthesized, but preferably will be thermally treated (calcined). Usually, it is desirable to remove the alkali metal cation by ion exchange and replace it with hydrogen, ammonium, or any desired metal ion. The zeolite can be leached with chelating agents, e.g., EDTA or dilute acid solutions, to increase the silica to alumina mole ratio. The zeolite can also be steamed; steaming helps stabilize the crystalline lattice to attack from acids.

The zeolite can be used in intimate combination with hydrogenating components, such as tungsten, vanadium molybdenum, rhenium, nickel cobalt, chromium, manganese, or a noble metal, such as palladium or platinum, for those applications in which a hydrogenation-dehydrogenation function is desired.

Metals may also be introduced into the zeolite by replacing some of the cations in the zeolite with metal cations via standard ion exchange techniques (see, for example, U.S. Pat. No. 3,140,249 issued Jul. 7, 1964 to Plank et al.; U.S. Pat. No. 3,140,251 issued Jul. 7, 1964 to Plank et al.; and U.S. Pat. No. 3,140,253 issued Jul. 7, 1964 to Plank et al.). Typical replacing cations can include metal cations, e.g., rare earth, Group IA, Group IIA and Group VIII metals, as well as their mixtures. Of the replacing metallic cations, cations of metals such as rare earth, Mn, Ca, Mg, Zn, Cd, Pt, Pd, Ni, Co, Ti, Al, Sn, and Fe are particularly preferred.

The hydrogen, ammonium, and metal components can be ion-exchanged into the SSZ-57. The zeolite can also be impregnated with the metals, or the metals can be physically and intimately admixed with the zeolite using standard methods known to the art.

Typical ion-exchange techniques involve contacting the synthetic zeolite with a solution containing a salt of the desired replacing cation or cations. Although a wide variety of salts can be employed, chlorides and other halides, acetates, nitrates, and sulfates are particularly preferred. The zeolite is usually calcined prior to the ion-exchange procedure to remove the organic matter present in the channels and on the surface, since this results in a more effective ion exchange. Representative ion exchange techniques are disclosed in a wide variety of patents including U.S. Pat. No. 3,140,249 issued on Jul. 7, 1964 to Plank et al.; U.S. Pat. No. 3,140,251 issued on Jul. 7, 1964 to Plank et al.; and U.S. Pat. No. 3,140,253 issued on Jul. 7, 1964 to Plank et al.

Following contact with the salt solution of the desired replacing cation, the zeolite is typically washed with water and dried at temperatures ranging from 65° C. to about 200° C. After washing, the zeolite can be calcined in air or inert gas at temperatures ranging from about 200° C. to about 800° C. for periods of time ranging from 1 to 48 hours, or more, to produce a catalytically active product especially useful in hydrocarbon conversion processes.

Regardless of the cations present in the synthesized form of SSZ-57, the spatial arrangement of the atoms which form the basic crystal lattice of the zeolite remains essentially unchanged.

SSZ-57 can be formed into a wide variety of physical shapes. Generally speaking, the zeolite can be in the form of a powder, a granule, or a molded product, such as extrudate having a particle size sufficient to pass through a 2-mesh (Tyler) screen and be retained on a 400-mesh (Tyler) screen. In cases where the catalyst is molded, such as by extrusion with an organic binder, the aluminosilicate can be extruded before drying, or dried or partially dried and then extruded.

SSZ-57 can be composited with other materials resistant to the temperatures and other conditions employed in organic conversion processes. Such matrix materials include active and inactive materials and synthetic or naturally occurring zeolites as well as inorganic materials such as clays, silica and metal oxides. Examples of such materials and the manner in which they can be used are disclosed in U.S. Pat. No. 4,910,006, issued May 20, 1990 to Zones et al., and U.S. Pat. No. 5,316,753, issued May 31, 1994 to Nakagawa, both of which are incorporated by reference herein in their entirety.

SSZ-57 is useful in catalysts for hydrocarbon conversion reactions such as hydrocracking, dewaxing, isomerization and the like.

EXAMPLES

The following examples demonstrate but do not limit the present invention.

Example 1

Synthesis of Boron-SSZ-57

A 23 cc Teflon liner is charged with 4.8 gm of 0.625 M aqueous solution of N-butyl-N-cyclohexylpyrrolidinium hydroxide (3 mmol template), 1.2 gm of 1M aqueous solution of NaOH (1.2 mmol NaOH) and 6 gm of de-ionized water. To this mixture, 0.06 gm of sodium borate decahydrate (0.157 mmol of $Na_2B_4O_7 \cdot 10H_2O$; about 0.315 mmol $B_2O_3$) are added and stirred until completely dissolved. Then, 0.9 gm of CABOSIL-M-5, fumed $SiO_2$, (about 14.7 mmol $SiO_2$) is added to the solution and the mixture was thoroughly stirred. The resulting gel is capped off and placed in a Parr bomb steel reactor and heated in an oven at 160° C. while rotating at 43 rpm. The reaction is monitored by checking the gel's pH, and by looking for crystal formation using Scanning Electron Microscopy (SEM) at six day intervals. The reaction is completed after heating for 18 days at the conditions described above. Once the crystallization is complete, the starting reaction gel turns to a mixture comprising of a clear liquid layer with solids (powder) that settles to the bottom. The mixture is filtered through a fritted-glass funnel. The collected solids are thoroughly washed with water and then rinsed with acetone (10 ml) to remove any organic residues. The solids are allowed to air-dry over night and then dried in an oven at 120° C. for 1 hour. The reaction affords 0.8 gram of a very fine powder. SEM shows the presence of only one crystalline phase. The X-ray analysis of the powder indicates that the material is SSZ-57.

Table 5 below shows the XRD data for the as-made material.

TABLE 5

| 2 Theta (deg.)[a] | d-spacing (Å) | Intensity I/Io × 100 |
| --- | --- | --- |
| 7.74 | 11.413 | 32 |
| 8.78 | 10.063 | 22 |
| 11.72 | 7.545 | 7 |
| 12.42 | 7.121 | 5 |
| 13.86 | 6.384 | 2 |
| 14.26 | 6.206 | 3 |
| 14.66 | 6.038 | 4 |
| 15.56 | 5.690 | 4 |
| 17.14 | 5.169 | 3 |
| 17.64 | 5.024 | 3 |
| 18.96 | 4.677 | 3 |
| 19.28 | 4.600 | 1 |
| 19.76 | 4.489 | 2 |
| 20.86 | 4.255 | 4 |
| 21.82 | 4.070 | 1 |
| 23.04 | 3.857 | 100 |
| 23.44 | SH3.792 | 5 |
| 24.32 | 3.657 | 12 |
| 25.98 | 3.427 | 3 |

TABLE 5-continued

| 2 Theta (deg.)[a] | d-spacing (Å) | Intensity I/Io × 100 |
|---|---|---|
| 26.62 | 3.346 | 5 |
| 27.75 | 3.212 | 1 |
| 28.96 | 3.081 | 3 |
| 29.46 | 3.030 | 2 |
| 30.22 | 2.955 | 6 |
| 31.54 | 2.834 | 1 |
| 32.36 | 2.764 | 1 |
| 34.10 | 2.627 | 2 |
| 35.40 | 2.534 | 2 |
| 35.76 | 2.509 | 2 |
| 36.18 | 2.481 | 2 |
| 36.90 | 2.434 | 1 |
| 37.64 | 2.388 | 1 |
| 43.24 | 2.091 | 1 |
| 45.12 | 2.008 | 7 |
| 45.30 | SH2.000 | 4 |
| 47.52 | 1.912 | 1 |
| 48.52 | 1.875 | 2 |

SH = Shoulder
[a] ± 0.15

Table 6 below shows the results of making B-SSZ-57 at varying SiO2/B2O3 ratios. The synthesis was carried out as described in Example 1 keeping the amounts of all reagents constant but varying the amount of sodium borate decahydrate.

TABLE 6

Synthesis of SSZ-57 at varying $SiO_2/B_2O_3$ ratios

| $SiO_2/B_2O_3$ | $SiO_2/Na$ | Days | Observed Products |
|---|---|---|---|
| ∞ (all Silica) | 12.25 | 15 | SSZ-57 |
| 280 | 11.74 | 15 | SSZ-57 |
| 140 | 11.26 | 15 | SSZ-57 |
| 93.6 | 10.83 | 18 | SSZ-57 |
| 70 | 10.42 | 18 | SSZ-57 |
| 56 | 10.05 | 18 | SSZ-57 |
| 46.3 | 9.7 | 18 | SSZ-57 |
| 40 | 9.38 | 18 | SSZ-57 |
| 35 | 9.07 | 18 | SSZ-57 |
| 31 | 8.8 | 18 | SSZ-57 |
| 28 | 8.52 | 18 | SSZ-57 |
| 25.5 | 8.27 | 18 | SSZ-57 |
| 23.3 | 8.03 | 18 | SSZ-57 |
| 21.55 | 7.81 | 21 | SSZ-57 & trace of Layered |
| 18.67 | 7.4 | 21 | SSZ-57 & trace of layered Material |

The synthesis is carried out exactly as described in Example 1 keeping the amount of NaOH, water and CABOSIL-M-5 the same while varying the amount of $Na_2B_4O_7 \cdot 10H_2O$. $SiO_2/OH=3.5$, $H_2O/SiO_2=45$. The reactions are carried out at 160° C. and 43 rpm.

Example 2

Seeded Synthesis of Boron-SSZ-57

A 23 cc Teflon liner is charged with 4.8 gm of 0.625M aqueous solution of N-butyl-N-cyclohexylpyrrolidinium hydroxide (3 mmol template), 1.2 gm of 1M aqueous solution of NaOH (1.2 mmol NaOH) and 6 gm of de-ionized water. To this mixture, 0.06 gm of sodium borate decahydrate (0.157 mmol of $Na_2B_4O_7 \cdot 10H_2O$; ~0.315 mmol $B_2O_3$) is added and stirred until completely dissolved. Then, 0.9 gm of CABOSIL-M-5 (~14.7 mmol $SiO_2$) and 0.04 gm of SSZ-57 (the product of Example 1) are added to the solution and the mixture is thoroughly stirred. The resulting gel is capped off and placed in a Parr bomb steel reactor and heated in an oven at 160° C. while rotating at 43 rpm. The reaction is monitored by checking the gel's pH, and by looking for crystal formation using Scanning Electron Microscopy (SEM) at two day intervals. The reaction is completed after heating for 6 days at the conditions described above. Once the crystallization is complete, the starting reaction gel turns to a mixture comprising a clear liquid layer with solids (powder) that settle to the bottom. The mixture is filtered through a fritted-glass funnel. The collected solids are thoroughly washed with water and then rinsed with acetone (10 ml) to remove any organic residues. The solids are allowed to air-dry over night and then dried in an oven at 120° C. for one hour. The reaction affords 0.86 gram of a very fine powder. SEM shows the presence of only one crystalline phase. Powder X-ray diffraction pattern of the product indicates the material is identical to the product of Example 1.

Example 3

Synthesis of Aluminum-SSZ-57 (using LZ-Y52 as Aluminum Source)

A 23 cc Teflon liner is charged with 3.6 gm of 0.625M aqueous solution of N-butyl-N-cyclohexylpyrrolidinium hydroxide (2.25 mmol template), 1.5 gm of 1M NaOH aqueous solution (1.5 mmol NaOH) and 2.3 gm of de-ionized water. To this solution, 0.26 gm of sodium-Y zeolite (Union Carbide LZ-Y52: $SiO_2/Al_2O_3=5$) and 0.80 gm of CABOSIL-M-5, fumed $SiO_2$, (about 13 mmol $SiO_2$) are added, consecutively. The mixture is thoroughly stirred and the resulting gel is capped off and placed in a Parr bomb Steel reactor and heated in an oven at 160° C. while rotating at 43 rpm. The reaction is monitored by checking the gel's pH, and by looking for crystal formation using Scanning Electron Microscopy (SEM) at six day intervals. The reaction is completed after heating at the conditions described above for 6 days. The completed reaction mixture appears as a colorless liquid with fine white solid settled at the bottom of the Teflon liner. The mixture is filtered through a fritted-glass funnel, and the obtained white solids are washed generously with water and then rinsed with a small a mount of acetone and allowed to air-dry overnight. The obtained solids are further dried in an oven at 120° C. for one hour. The reaction yields 0.82 gm of SSZ-57 as indicated by the powder X-ray analysis of the product and a trace of the starting reagent LZ-Y52 zeolite.

Table 7 below shouts the results of attempts at making Al-SSZ-57 at varying SiO2/B2O3 ratios. The synthesis was carried out exactly as described in example 3 but varying the amount of LZ-Y52 while keeping all the amounts of all other reagents constant.

TABLE 7

Synthesis of SSZ-57 at varying $SiO_2/Al_2O_3$ ratios

| $SiO_2/Al_2O_3$ | $SiO_2/Na$ | Days | Observed Products |
|---|---|---|---|
| ∞ (all Silica) | 8.7 | 18 | SSZ-57, trace of Layered |
| 317 | 8.4 | 12 | SSZ-57 |
| 158.5 | 8.1 | 12 | SSZ-57 |
| 107.5 | 7.78 | 12 | SSZ-57 |
| 82.5 | 7.5 | 12 | SSZ-57 |
| 66.9 | 7.3 | 12 | SSZ-57 |
| 56.5 | 7.1 | 12 | SSZ-57 |
| 49 | 6.9 | 12 | SSZ-57, trace LZ-Y52 |
| 43.5 | 6.7 | 12 | SSZ-57, trace LZ-Y52 |
| 39 | 6.6 | 12 | SSZ-57, trace LZ-Y52 |

TABLE 7-continued

Synthesis of SSZ-57 at varying $SiO_2/Al_2O_3$ ratios

| $SiO_2/Al_2O_3$ | $SiO_2/Na$ | Days | Observed Products |
|---|---|---|---|
| 35.8 | 6.4 | 12 | SSZ-57 (major), LZ-Y52 (minor) |
| 33 | 6.26 | 12 | SSZ-57 (major), LZ-Y52 (minor) |
| 30.8 | 6.16 | 12 | SSZ-57 (major), LZ-Y52 (minor) |
| 26.3 | 5.85 | 18 | SSZ-57 (major), LZ-Y52 (minor) |
| 23.8 | 5.66 | 18 | SSZ-57 (major), LZ-Y52 (minor) |
| 20 | 5.32 | 18 | SSZ-57 (major), LZ-Y52 (minor |

The reactions are carried out exactly as in Example 3 above (160° C. and 43 rpm) using Union Carbide's LZ-Y52 as the aluminum source and CABOSIL-M-5 as the $SiO_2$ source. $SiO_2/OH=8.7$, $H_2O/SiO_2=28$.

SSZ-57 is prepared in a similar manner using N-propyl-N-cycloheptylpyrrolidinium cation or N-butyl-N-cyclooctylpyrrolidinium as the tempting agent.

Example 4

Synthesis of Al-SSZ-57 (Using Reheis F-2000 as Aluminum Source)

A 23 cc Teflon liner is charged with 3.6 gm of 0.625M aqueous solution of N-butyl-N-cyclohexylpyrrolidinium hydroxide (2.25 mmol template), 1.5 gm of 1M NaOH aqueous solution (1.5 mmol NaOH) and 6.8 gm of de-ionized water. To this solution, 0.032 gm of Reheis F-2000 (0.164 mmol of $Al_2O_3$; 0.195 gm of Reheis F-2000=1 mmol $Al_2O_3$) are added and stirred until completely dissolved. Then, 0.90 gm of CABOSIL-M-5, fumed $SiO_2$, (about 14.7 mmol $SiO_2$) is added to the mixture and the resulting gel is capped off and placed in a Parr bomb Steel reactor and heated in an oven at 170° C. while rotating at 43 rpm. The reaction is monitored by checking the gel's pH, and by looking for crystallization using Scanning Electron Microscopy (SEM) at six day intervals. The reaction is completed after heating at the conditions described above for 18 days. The completed reaction mixture appears as a colorless liquid with fine white solid settled at the bottom of the Teflon liner. The mixture is filtered through a fritted-glass funnel, and the obtained white solids are washed generously with water and then rinsed with a small a mount of acetone and allowed to air-dry overnight. Then, the solids are further dried in an oven at 120° C. for one hour. The reaction yields 0.85 gm of SSZ-57 as indicated by the powder X-ray analysis of the product.

Example 5

Seeded Synthesis of Al-SSZ-57 (Using Reheis F-2000 as Aluminum Source)

A 23 cc Teflon liner is charged with 3.6 gm of 0.625M aqueous solution of N-butyl-N-cyclohexylpyrrolidinium hydroxide (2.25 mmol template), 1.5 gm of 1M NaOH aqueous solution (1.5 mmol NaOH) and 6.8 gm of de-ionized water. To this solution, 0.032 gm of Reheis F-2000 (0.164 mmol of $Al_2O_3$; 0.195 gm of Reheis F-2000=1 mmol $Al_2O_3$) is added and stirred until completely dissolved. Then, 0.90 gm of CABOSIL-M-5 (~14.7 mmol $SiO_2$) and 0.04 gm of SSZ-57 (the product of Example 4) are added to the mixture. The resulting gel is thoroughly stirred, capped off and placed in a Parr Steel reactor and heated in an oven at 170° C. while rotating at 43 rpm. The reaction is monitored by checking the gel's pH, and by looking for crystallization using Scanning Electron Microscopy (SEM). The reaction is completed after heating at the conditions described above for 5 days. The completed reaction mixture appears as a colorless liquid with fine white solid settled at the bottom of the Teflon liner. The mixture is filtered through a fritted-glass funnel, and the obtained white solids are washed generously with water and then rinsed with a small amount of acetone and allowed to air-dry overnight. Then, the solids are further dried in an oven at 120° C. for 1 hour. The reaction yields 0.9 gm of SSZ-57 as indicated by the powder X-ray analysis of the product.

Example 6

Synthesis of All Silica-SSZ-57

A 23 cc Teflon liner is charged with 4.8 gm of 0.625M aqueous solution of N-butyl-N-cyclohexylpyrrolidinium hydroxide (3 mmol template), 1.2 gm of 1M aqueous solution of NaOH (1.2 mmol NaOH) and 6 gm of de-ionized water. Then, 0.9 gm of CABOSIL-M-5, fumed $SiO_2$, (about 14.7 mmol $SiO_2$) is added to the solution and the mixture is thoroughly stirred. The resulting gel is capped off and placed in a Parr bomb steel reactor and heated in an oven at 160° C. while rotating at 43 rpm. The reaction is monitored by checking the gel's pH, and by looking for crystal formation using Scanning Electron Microscopy (SEM) at six day intervals. The reaction is completed after heating for 18 days at the conditions described above. Once the crystallization is complete, the starting reaction gel turns to a mixture comprising of a clear liquid layer with solids (powder) that settled to the bottom. The mixture is filtered through a fritted-glass funnel. The collected solids are thoroughly washed with water and then rinsed with acetone (10 ml) to remove any organic residues. The solids are allowed to air-dry over night and then dried in an oven at 120° C. for one hour. The reaction affords 0.86 gram of a very fine powder. SEM shows the presence of only one crystalline phase. The X-ray analysis of the powder indicates that the material is identical to the products of Examples 1, 2, 3, 4 and 5 above (SSZ-57).

Example 7

Synthesis of Tempting Agent N-butyl-N-cyclohexylpyrrolidinium Cation

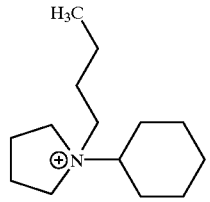

I. Synthesis of N-cyclohexylpyrrolidine

The structure-directing agent (SDA) is synthesized using the reaction sequence described in the scheme below. A three neck 3000-ml flask is charged with 100 gm (1.4 mole) of pyrrolidine, 50 gm of cyclohexanone (0.51 mole) and 1000 ml anhydrous hexane. To the resulting solution, 122 gm (1.022 mole) of anhydrous magnesium sulfate is added and the mixture is mechanically stirred and heated at reflux (the reaction is monitored by NMR analysis) for 96 hrs. The reaction mixture is filtered through a fritted glass funnel. The filtrate is concentrated under reduced pressure on a rotary evaporator to give 75 gm of a clear (yellow-tinted) oily substance. ¹H-NMR and ¹³C-NMR spectra are acceptable for the desired product 1-(1-pyrrolidino)cyclohexene. Saturation of 1-(1-pyrrolidino)cyclohexene, to give N-cyclohexylpyrrolidine, is accomplished in quantitative yield by hydrogenation in ethanol at a 55 psi pressure of hydrogen gas in the presence of 10% Pd on activated carbon.

N-cyclohexylpyrrolidine is also obtained by lithium aluminum hydride reduction of 1-cyclohexyl-2-pyrrolidinone. To a suspension of 22.7 gm (0.6 mole) of lithium aluminum hydride in 600 ml anhydrous tetrahydrofuran (THF) in a three-neck 3000-ml reaction flask at 0° C. (ice bath), 50 gm (0.3 mole) of 1-cyclohexyl-2-pyrrolidinone in 100 ml THF are added drop wise via an addition funnel. Once the addition is complete, the ice-bath is replaced with a heating mantle and the reaction is refluxed and mechanically stirred overnight. The reaction is kept protected from moisture. The reaction mixture is then cooled down to 0° C. (the heating mantle is replaced with an ice-bath) and the reaction mixture is diluted with 500 ml ether. The reaction is worked up by adding 75 ml of 15 wt. % NaOH aqueous solution drop wise at 0° C. with vigorous stirring. Once the addition of NaOH is finished, 15 ml of H₂O is added and the reaction mixture is left to stir for an additional 15 min. The grayish looking mixture turns into a two-phase mixture with a clear colorless liquid and a white precipitate. The mixture is filtered and the solids are thoroughly rinsed with ether. The filtrate and the ether rinses are combined and dried over anhydrous magnesium sulfate. Filtration and concentration of the filtrate under reduced pressure on a rotary evaporator give the desired reduction product as colorless oil in 95.7% yield (44 gm).

II. Quaternization (Synthesis of N-butyl-N-cyclohexylpyrrolidinium Iodide)

To a solution of 50 gm (0.326 mole) of N-cyclohexylpyrrolidine in 600 ml anhydrous methanol, 120 gm (0.652 mole) of butyl iodide is added. The reaction is mechanically stirred for 48 hours at room temperature. Then, an additional equivalent of butyl iodide and one equivalent (33.7 gm; 0.326 mole) of potassium bicarbonate are added and the reaction is stirred at refluxing temperature for 72 hours. The reaction mixture is concentrated under reduced pressure on a rotary evaporator to give an off-white-colored solid material. The solids are rinsed several times with chloroform and filtered after each rinse. All the chloroform rinses are combined and concentrated to give a white powder whose NMR data is acceptable for the desired quaternary ammonium iodide salt. The reaction affords 95 gm (86% yield) of the product. The iodide salt is purified by recrystallization. This is done by completely dissolving the iodide salt in acetone and then precipitating by the addition of ethyl ether to the acetone solution. The procedure gives 87 gm of white powder with very clean ¹H and ¹³C-NMR spectra for the product (N-butyl-N-cyclohexylpyrrolidinium iodide).

III. Ion Exchange (Synthesis of N-Butyl-N-Cyclohexylpyrrolidinium Hydroxide)

N-butyl-N-cyclohexylpyrrolidinium iodide salt (85 gm; 0.25 mol) is dissolved in 300 ml water in a 500-ml volume plastic bottle. To the solution, 300 gm of Ion-Exchange Resin-OH (BIO RAD® AH1-X8) is added and the mixture is stirred at room temperature overnight. The mixture is filtered and the solids are rinsed with additional 85 ml of water. The original filtrate and the rinse are combined and a small amount is titrated with 0.1N HCl to indicate the presence of 0.24 mol hydroxide (0.24 mol N-butyl-N-cyclohexylpyrrolidinium hydroxide) in the solution. The synthetic procedure described above is depicted below.

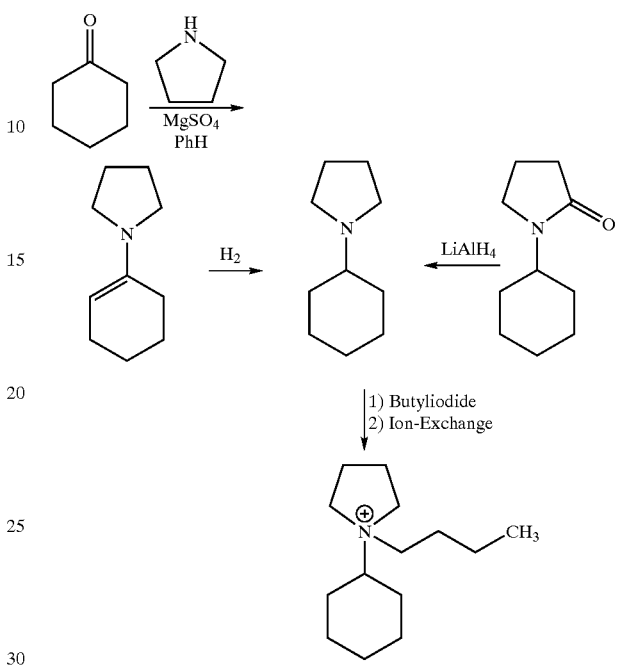

In a similar manner, N-propyl-N-cycloheptylpyrrolidinium cation and N-butyl-N-cyclooctylpyrrolidinium are prepared.

Example 8

Calcination of SSZ-57

The material from Examples 1 is calcined in the following manner. A thin bed of material is heated in a muffle furnace from room temperature to 120° C. at a rate of 1° C. per minute and held at 120° C. for three hours. The temperature is then ramped up to 540° C. at the same rate and held at this temperature for 5 hours, after which it is increased to 594° C. and held there for another 5 hours. A nitrogen stream with a slight bleed of air is passed over the zeolite at a rate of 20 standard cubic feet per minute during heating. The X-ray diffraction data for the product is provided in Table 8 below. Table 8 shows the XRD data for the calcined material.

TABLE 8

Calcined SSZ-57

| 2 Theta (deg.)(a) | d-spacing (Å) | Intensity I/Io × 100 |
|---|---|---|
| 7.72 | 11.443 | 100 |
| 8.78 | 10.063 | 74 |
| 11.74 | 7.532 | 2 |
| 12.43 | 7.115 | 2 |
| 13.84 | 6.393 | 3 |
| 14.24 | 6.215 | 1 |
| 14.70 | 6.021 | 17 |
| 15.56 | 5.690 | 8 |
| 17.16 | 5.163 | 1 |
| 17.66 | 5.018 | 11 |
| 19.00 | 4.667 | 2 |
| 19.32 | 4.591 | 1 |

TABLE 8-continued

Calcined SSZ-57

| 2 Theta (deg.)[a] | d-spacing (Å) | Intensity I/Io × 100 |
|---|---|---|
| 19.74 | 4.494 | 2 |
| 20.82 | 4.263 | 3 |
| 23.08 | 3.850 | 91 |
| 23.48 | SH 3.786 | 5 |
| 24.36 | 3.651 | 11 |
| 25.05 | 3.552 | 1 |
| 26.04 | 3.419 | 4 |
| 26.66 | 3.341 | 6 |
| 29.00 | 3.076 | 3 |
| 29.52 | 3.023 | 2 |
| 30.26 | 2.951 | 7 |
| 31.56 | 2.833 | 1 |
| 31.90 | 2.803 | 1 |
| 34.20 | 2.620 | 2 |
| 35.46 | 2.529 | 1 |
| 35.84 | 2.503 | 2 |
| 36.28 | 2.474 | 1 |
| 36.96 | 2.430 | 1 |
| 37.76 | 2.380 | 1 |
| 43.97 | 2.058 | 1 |
| 45.26 | 2.002 | 16 |
| 46.22 | 1.962 | 1 |
| 47.58 | 1.910 | 1 |
| 48.60 | 1.872 | 1 |

SH = Shoulder
[a] ± 0.15

Example 9

NH$_4$ Exchange

Ion exchange of calcined SSZ-57 material (prepared in Example 8) was performed using NH$_4$NO$_3$ to convert the zeolite from its Na$^+$ form to the NH$_4^+$ form, and, ultimately, the H$^+$ form. Typically, the same mass of NH$_4$NO$_3$ as zeolite is slurried in water at a ratio of 25–50:1 water to zeolite. The exchange solution is heated at 95° C. for 2 hours and then filtered. This procedure can be repeated up to three times. Following the final exchange, the zeolite is washed several times with water and dried. This NH$_4^+$ form of SSZ-57 can then be converted to the H$^+$ form by calcination (as described in Example 9) to 540° C.

Example 10

N$_2$ Micropore Volume

The H$^+$ form of the product of Example 1 after treated as in example 8 and 9 was subjected to a surface area and micropore volume analysis using N$_2$ as adsorbate and via the BET method. The surface area of the zeolitic material is 52 M$^2$/g and the micropore volume is 0.17 cc/g with at total pore volume of 0.2 cc/gm and a BET area of 415 m$^2$/gm.

Example 11

Constraint Index Determination

The hydrogen form of the zeolite of Example 5 (after treatment according to Examples 8 and 9) is pelletized at 2–3 KPSI, crushed and meshed to 20–40, and then >0.50 gram is calcined at about 540° C. in air for four hours and cooled in a desiccator. 0.50 Gram is packed into a 3/8 inch stainless steel tube with alundum on both sides of the zeolite bed. A Lindburg furnace is used to heat the reactor tube. Helium is introduced into the reactor tube at 10 cc/min. and at atmospheric pressure. The reactor is heated to about 315° C., and a 50/50 (w/w) feed of n-hexane and 3-methylpentane is introduced into the reactor at a rate of 8 μl/min. Feed delivery is made via a Brownlee pump. Direct sampling into a gas chromatograph begins after 10 minutes of feed introduction. The Constraint Index value is calculated from the gas chromatographic data using methods known in the art, and is found to be 1.05 at 315° C. and 10 minutes on-stream. Feed conversion is greater than 82%. The data suggest an intermediate pore zeolite with high catalytic activity.

Example 12

Hydrocracking of n-Hexadecane

A sample of SSZ-57 as prepared in Example 5 was treated as in Examples 8 and 9. Then a sample was slurried in water and the pH of the slurry was adjusted to a pH of ~10 with dilute ammonium hydroxide. To the slurry was added a solution of Pd(NH$_3$)$_4$(NO$_3$)$_2$ at a concentration which would provide 0.5 wt. % Pd with respect to the dry weight of the zeolite sample. This slurry was stirred for 48 hours at 100° C. After cooling, the slurry was filtered through a glass frit, washed with de-ionized water, and dried at 100° C. The catalyst was then calcined slowly up to 900° F. in air and held there for three hours.

The calcined catalyst was pelletized in a Carver Press and crushed to yield particles with a 20/40 mesh size range. Sized catalyst (0.5 g) was packed into a ¼ OD tubing reactor in a micro unit for n-hexadecane hydroconversion. Table 9 gives the run conditions and the products data for the hydrocracking test on n-hexadecane. After the catalyst was tested with n-hexadecane, it was titrated using a solution of butyl amine in hexane. The temperature was increased and the conversion and product data evaluated again under titrated conditions. The results shown in Table 9 show that SSZ-57 is effective as a hydrocracking catalyst.

TABLE 9 n-Hexadecane Hydrocracking Test Data

| Temperature | 488° F. | 540° F. |
|---|---|---|
| Time-on Stream | 26.6–30 | 72.1–72.6 |
| WHSV | 1.55 | 1.55 |
| PSIG | 1200 | 1200 |
| Titrated | No | Yes |
| n-16, % Conversion | 82.1 | 86.2 |
| Hydrocracking Conversion % | 57.6 | 49.5 |
| Isomerization Selectivity % | 28.3 | 41.8 |
| Cracking Selectivity % | 71.7 | 58.2 |
| C$_{4-}$, % | 8.3 | 6 |
| C$_5$/C$_4$, % | 12.8 | 8.8 |
| C$_5$ + C$_6$/C$_5$, % | 31.6 | 21.6 |
| DMB/MP | 0 | 0 |
| DMB/nC$_6$ | 0 | 0 |
| C$_4$–C$_{13}$, i/n | 0.8 | 1.13 |

What is claimed is:

1. A zeolite having a mole ratio greater than about 20 of an oxide selected from silicon oxide, germanium oxide and mixtures thereof to boron oxide or a combination of boron oxide and aluminum oxide, gallium oxide, indium oxide, titanium oxide or a mixture thereof and having, after calcination, the X-ray diffraction lines of Table 3.

2. A zeolite according to claim 1 wherein the oxides comprise silicon oxide and boron oxide.

3. A zeolite according to claim 1 wherein the oxides comprise silicon oxide, boron oxide and aluminum oxide.

4. A zeolite according to claim 1 wherein said zeolite is predominantly in the hydrogen form.

5. A zeolite according to claim 1 wherein said zeolite is substantially free of acidity.

6. A zeolite having a composition, as synthesized and in the anhydrous state, in terms of mole ratios as follows:

| | |
|---|---|
| $YO_2/W_cO_d$ | 20– |
| $M_{2/n}/YO_2$ | 0.01–0.03 |
| $Q/YO_2$ | 0.02–0.05 | wherein Y is silicon, germanium or a mixture thereof, W is boron or a combination of boron and aluminum, gallium, indium, titanium or a mixture thereof; c is c is 1 or 2; d is 2 when c is 1 or d is 3 or 5 when c is 2 M is an alkali metal cation, alkaline earth metal cation or mixtures thereof; n is the valence of M; and Q comprises a N-butyl-N-cyclohexylpyrrolidinium cation, N-propyl-N-cycloheptylpyrrolidinium cation or N-butyl-N-cyclooctylpyrrolidinium cation.

7. A zeolite according to claim 6 wherein Y is silicon and W is boron.

8. A zeolite according to claim 6 wherein Y is silicon and W is a mixture of boron and aluminum.

9. A method of preparing a crystalline material comprising an oxide selected from silicon oxide, germanium oxide and mixtures thereof to boron oxide or a combination of boron oxide and aluminum oxide, gallium oxide, indium oxide, titanium oxide or a mixture thereof, said method comprising contacting under crystallization conditions sources of said oxides and a tempting agent comprising a N-butyl-N-cyclohexylpyrrolidinium cation, N-propyl-N-cycloheptylpyrrolidinium cation or N-butyl-N-cyclooctylpyrrolidinium cation.

10. The method of claim 9 wherein the crystalline material has, after calcination, the X-ray diffraction lines of Table 3.

11. The method of claim 9 wherein the tempting agent is a N-butyl-N-cyclohexylpyrrolidinium cation.

12. The method of claim 9 wherein the tempting agent is a N-propyl-N-cycloheptylpyrrolidinium cation.

13. The method of claim 9 wherein the tempting agent is a N-butyl-N-cyclooctylpyrrolidinium cation.

14. A zeolite having a mole ratio greater than about 20 of an oxide selected from silicon oxide, germanium oxide and mixtures thereof to boron oxide, aluminum oxide, gallium oxide, indium oxide, titanium oxide or a mixture thereof and having, after calcination, the X-ray diffraction lines of Table 3.

15. A zeolite according to claim 14 wherein the oxides comprise silicon oxide and aluminum oxide.

16. A zeolite according to claim 14 wherein the oxide comprises silicon oxide.

17. A zeolite having a composition, as synthesized and in the anhydrous state, in terms of mole ratios as follows:

| | |
|---|---|
| $YO_2/W_cO_d$ | 20– |
| $M_{2/n}/YO_2$ | 0.01–0.03 |
| $Q/YO_2$ | 0.02–0.05 | wherein Y is silicon, germanium or a mixture thereof; W is boron, aluminum, gallium, indium, titanium or a mixture thereof; c is c is 1 or 2; d is 2 when c is 1 or d is 3 or 5 when c is 2 M is an alkali metal cation, alkaline earth metal cation or mixtures thereof, n is the valence of M; and Q comprises a N-butyl-N-cyclohexylpyrrolidinium cation, N-propyl-N-cycloheptylpyrrolidinium cation or N-butyl-N-cyclooctylpyrrolidinium cation.

18. A zeolite according to claim 17 wherein the oxides comprise silicon oxide and aluminum oxide.

19. A zeolite according to claim 17 wherein $YO_2/W_cO_d$ is $\infty$.

* * * * *